United States Patent
Liao et al.

(10) Patent No.: US 12,374,347 B2
(45) Date of Patent: Jul. 29, 2025

(54) VOICE CONVERSION METHOD, MODEL TRAINING METHOD, DEVICE, MEDIUM, AND PROGRAM PRODUCT

(71) Applicant: Shanghai Lilith Technology Corporation, Shanghai (CN)

(72) Inventors: Huanhua Liao, Shanghai (CN); Junfeng Li, Shanghai (CN); Zhikai Li, Shanghai (CN); Haonan Zhao, Shanghai (CN); Xin Xiong, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 0 days.

(21) Appl. No.: 18/690,896

(22) PCT Filed: Jun. 7, 2023

(86) PCT No.: PCT/CN2023/098909
§ 371 (c)(1),
(2) Date: Jul. 2, 2024

(87) PCT Pub. No.: WO2024/250197
PCT Pub. Date: Dec. 12, 2024

(65) Prior Publication Data
US 2024/0412749 A1    Dec. 12, 2024

(51) Int. Cl.
*G10L 13/00*    (2006.01)
*G10L 17/02*    (2013.01)
(Continued)

(52) U.S. Cl.
CPC ............ *G10L 21/01* (2013.01); *G10L 17/02* (2013.01); *G10L 17/04* (2013.01); *G10L 17/06* (2013.01); *G10L 25/18* (2013.01)

(58) Field of Classification Search
None
See application file for complete search history.

(56) References Cited

U.S. PATENT DOCUMENTS

2019/0354852 A1* 11/2019 Sadowski ............... G06N 3/048
2020/0051565 A1*  2/2020 Singh .................... G10L 15/02
(Continued)

FOREIGN PATENT DOCUMENTS

| CN | 114724568 A | 8/2022 |
| CN | 116469400 A | 7/2023 |

*Primary Examiner* — Jakieda R Jackson

(57) ABSTRACT

A voice conversion method used in an electronic device, including determining a target speech to be converted and a content representation vector corresponding to the target speech, where the target speech has a first content and a first voiceprint, and the content representation vector is obtained based on the speech waveform of the target speech; determining a reference speech and a voiceprint representation vector corresponding to the reference speech, where the reference speech has a second voiceprint, and the second voiceprint is different from the first voiceprint; generating a converted speech based on a speech generator according to the content representation vector and the voiceprint representation vector; where the converted speech has the first content and the second voiceprint; where the speech generator is obtained by jointly training a preset speech generation network and a preset discriminator network by using a training speech having the second voiceprint.

14 Claims, 6 Drawing Sheets

(51) Int. Cl.
  *G10L 17/04* (2013.01)
  *G10L 17/06* (2013.01)
  *G10L 21/01* (2013.01)
  *G10L 25/18* (2013.01)

(56) References Cited

U.S. PATENT DOCUMENTS

| | | | |
|---|---|---|---|
| 2021/0005216 A1* | 1/2021 | Chen | G10L 25/51 |
| 2021/0089909 A1* | 3/2021 | Binkowski | G06N 3/08 |
| 2021/0217404 A1* | 7/2021 | Jia | G10L 17/04 |
| 2021/0383241 A1* | 12/2021 | Karras | G06N 20/00 |
| 2021/0383789 A1* | 12/2021 | Donahue | G06N 3/04 |
| 2021/0383790 A1* | 12/2021 | Salimans | G10L 25/30 |
| 2023/0014624 A1* | 1/2023 | Rios | G06T 11/00 |
| 2023/0130777 A1* | 4/2023 | Spall | G10L 15/16 |
| | | | 704/232 |
| 2023/0352001 A1* | 11/2023 | Carmiel | G10L 13/10 |
| 2024/0257819 A1* | 8/2024 | Boros | G10L 25/30 |
| 2024/0412440 A1* | 12/2024 | Zhang | G10L 25/30 |

* cited by examiner

VOICE CONVERSION METHOD, MODEL TRAINING METHOD, DEVICE, MEDIUM, AND PROGRAM PRODUCT

TECHNICAL FIELD

The present invention relates to the field of voice processing technologies, and in particular, to a voice conversion method, a model training method, a device, a medium, and a program product.

BACKGROUND

Various types of non-player characters often appear in games. To improve game experience of players, these game characters are usually dubbed by dubbing actors according to scripts. For the game players who speak different languages, because the original dubbing actors cannot be proficient in all languages, a game often needs to hire replacement dubbing actors in different languages, which consumes a lot of dubbing time and costs a lot. With the help of a voice conversion technology, voices of the dubbing actors can be used to dub the game characters in different language versions.

The voice conversion technology aims to convert a source speech into a voice of a dubbing actor, that is, to clone a voiceprint of the dubbing actor to the source speech, so that the generated target speech sounds like the dubbing actor is saying the same content as the source speech. The voice conversion technology can be classified into two categories according to whether the source/reference speech data used for conversion is parallel: a parallel conversion technology and a non-parallel conversion technology. The parallel conversion technology requires that the source speaker and the dubbing actor speak the same content, while the non-parallel conversion technology does not have this requirement. However, only non-parallel speech data can be used for a cross-language voice conversion technology.

At present, for cross-language voice conversion, corresponding phonetic features are obtained by mainly analyzing the source speech, and then frequency-domain features are transformed into time-domain waveforms with the help of a vocoder. When this method is used, a problem of mismatch between phonetic features input to the vocoder during actual voice conversion and phonetic features used in vocoder training may easily occur.

With the development of artificial intelligence, there are currently many voice conversion methods based on neural network models, such as voice conversion methods based on a cycle generative adversarial network (Cycle Generative Adversarial Network, CycleGAN) or a variational auto-encoder (Variational Auto-Encoder, VAE). However, because the speech is highly periodic and the human ear is sensitive to audio discontinuities, it is difficult to generate high-fidelity audio by using the methods based on neural network models, and the converted speech is prone to over-smoothing.

SUMMARY

In view of the above problems of the prior art, an objective of the present invention is to provide a voice conversion method, a model training method, a device, a medium, and a program product, to avoid a problem of feature mismatch occurring when a phonetic feature is converted into a time domain waveform, thereby improving accuracy of voice conversion.

To solve the problem, the present invention provides a voice conversion method, used for an electronic device, and the method includes:
a content representation vector determining step: determining a target speech to be converted and a content representation vector corresponding to the target speech; where the target speech has a first content and a first voiceprint, and the content representation vector is obtained based on the speech waveform of the target speech;
a voiceprint representation vector determining step: determining a reference speech and a voiceprint representation vector corresponding to the reference speech, where the reference speech has a second voiceprint, and the second voiceprint is different from the first voiceprint;
a voice conversion step: generating a converted speech based on a speech generator according to the content representation vector and the voiceprint representation vector; where the converted speech has the first content and the second voiceprint; where
the speech generator is obtained by jointly training a preset speech generation network and a preset discriminator network by using a training speech having the second voiceprint.

Further, the speech generator is obtained by jointly training the speech generation network and the discriminator network based on a first loss function and a second loss function by using the training speech; where
a value of the first loss function is obtained by calculation according to a training converted speech corresponding to the training speech, a value of the second loss function is obtained by inputting the training speech and the training converted speech corresponding to the training speech into the discriminator network to perform discrimination and calculation, the training converted speech is obtained by inputting a training content representation vector and a training voiceprint representation vector corresponding to the training speech into the speech generation network, and the training content representation vector is obtained according to the speech waveform of the training speech.

Optionally, the content representation vector determining step includes:
determining the speech waveform of the target speech; and
inputting the speech waveform of the target speech into a content encoder to obtain the corresponding content representation vector.

Optionally, the voiceprint representation vector determining step includes:
extracting a Mel-spectrogram feature of the reference speech; and
inputting the Mel-spectrogram feature into a voiceprint encoder to obtain a corresponding mean vector and a variance diagonal matrix; and
determining the voiceprint representation vector corresponding to the reference speech according to the mean vector and the variance diagonal matrix.

Optionally, the method further includes:
performing 1×1 convolution on the voiceprint representation vector to obtain one or more convolved voiceprint representation vectors; where
a dimension of each convolved voiceprint representation vector is at least the same as an input dimension of one decoder in the speech generator; and the voice conversion step includes:
inputting the content representation vector and the one or more convolved voiceprint representation vectors into the speech generator to obtain the converted speech.

Further, the reference speech has a second content, and the second content is different from the first content.

Another aspect of the present invention provides a model training method, used for an electronic device, and the method includes:
- a training speech obtaining step: obtaining multiple training speeches having a second voiceprint;
- a training representation vector determining step: determining a training content representation vector and a training voiceprint representation vector corresponding to each training speech, where the training content representation vector is obtained based on the speech waveform of the training speech;
- a training speech conversion step: inputting the training content representation vector and the training voiceprint representation vector corresponding to each training speech into a preset speech generation network, to obtain a corresponding training converted speech;
- a first calculation step: calculating a value of a first loss function based on the training converted speech;
- a second calculation step: inputting each training speech and the training converted speech corresponding to each training speech into a preset discriminator network to perform discrimination, and calculating a value of a second loss function;
- a parameter updating step: updating network parameters of the speech generation network based on the value of the first loss function, and updating network parameters of the discriminator network based on the value of the second loss function;
- an iterative training step: performing iterative training based on the speech generation network and the discriminator network after the parameters are updated, until the value of the first loss function and the value of the second loss function both meet a model convergence condition; and
- a generator determining step: using the trained speech generation network as a speech generator.

Optionally, the training representation vector determining step includes:
determining a training content representation vector corresponding to each training speech based on a preset content encoding network; and
determining a training voiceprint representation vector corresponding to each training speech based on a preset voiceprint encoding network; and
the model training method further includes:
updating network parameters of the content encoding network and the voiceprint encoding network based on the value of the first loss function; and
using the trained content encoding network as a content encoder, and using the trained voiceprint encoding network as a voiceprint encoder.

Optionally, both the content encoding network and the voiceprint encoding network are encoding networks based on an attention mechanism, and the speech generation network is a decoding network based on an attention mechanism.

Optionally, the content encoding network includes multiple Transformer encoders, the voiceprint encoding network includes multiple Transformer encoders and an average pooling layer, the speech generation network includes multiple Transformer decoders, and the discriminator network includes multiple discriminators.

Another aspect of the present invention provides an electronic device, including a memory, a processor, and a computer program stored on the memory, and the processor executes the computer program to implement the voice conversion method or the model training method described above.

Another aspect of the present invention provides a computer-readable storage medium on which a computer program/instruction is stored, and when the computer program/instruction is executed by a processor, the voice conversion method or the model training method described above is implemented.

Another aspect of the present invention provides a computer program product, including a computer program/instruction, and when the computer program/instruction is executed by a processor, the voice conversion method or the model training method described above is implemented.

Due to the above technical solution, the present invention has the following beneficial effects:

According to the voice conversion method of the embodiment of the present invention, the content and the voiceprint of the target speech and the reference speech are separately encoded, and waveform generation is performed by using a pre-trained speech generator according to the content representation vector obtained based on the speech waveform of the target speech and the voiceprint representation vector of the reference speech, so that a voiceprint encoding result of the reference speech can be directly used for constraints on the waveform of the target speech to generate a waveform of the converted speech, and there is no need to use the phonetic feature of the target speech, so that a problem of feature mismatch occurring when the phonetic feature is converted into a time domain waveform can be avoided, thereby improving accuracy of voice conversion.

According to the model training method of the embodiment of the present invention, the content and the voiceprint of the training speech are separately encoded, and the obtained training voiceprint representation vector and the training content representation vector obtained based on the speech waveform of the training speech are input into the speech generation network to train the speech generator, the training converted speech generated by the speech generation network is input into the discriminator network to train the discriminator, the speech generator obtained by training can directly obtain the waveform of the converted speech by converting according to the waveform of the target speech, and there is no need to use the phonetic feature of the target speech, so that a problem of feature mismatch occurring when the phonetic feature is converted into a time domain waveform can be avoided, and accuracy of voice conversion is improved.

In addition, the speech generator in the embodiment of the present invention can be obtained by training only by using the training speech having the second voiceprint. In a cross-language voice conversion scenario, there is no need for a corpus of the target speech language, and there is no need for a corpus of the target speech language by a dubbing actor, and therefore a problem that the corpus of the target speech language used by the dubbing actor is inadequate can be overcome.

BRIEF DESCRIPTION OF DRAWINGS

In order to explain the technical solution of the present invention more clearly, the accompanying drawings needed to be used in the embodiments or description of the prior art are briefly introduced below. Obviously, the drawings in the following description are only some embodiments of the present invention. For persons of ordinary skill in the art, other drawings can also be obtained based on these drawings without exerting creative efforts.

DETAILED DESCRIPTION OF EMBODIMENTS

Figure 1:
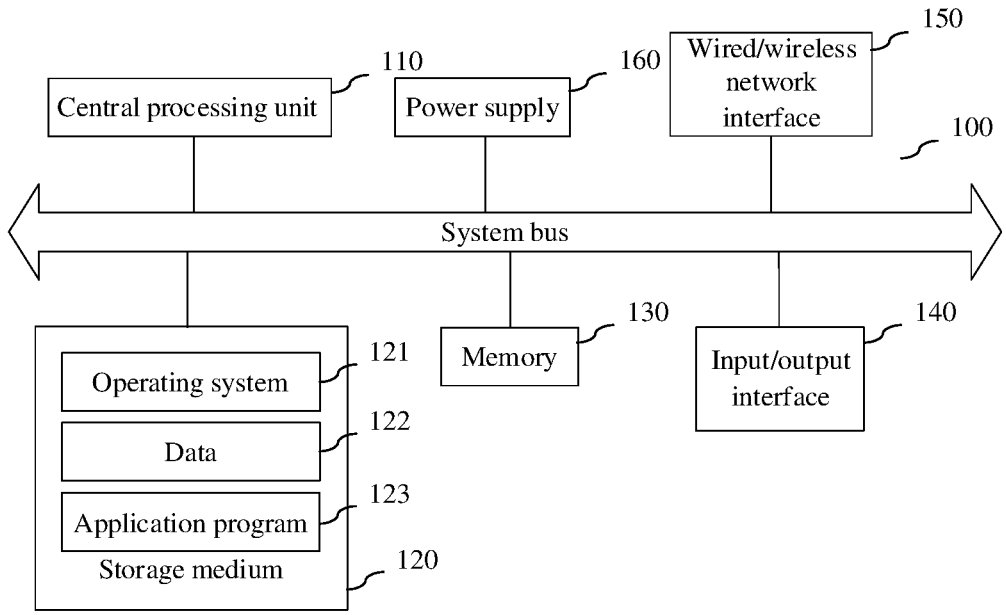
FIG. 1 is a schematic structural diagram of an electronic device according to an embodiment of the present invention.

In order to enable a person skilled in the art to better understand the solutions of the present invention, the technical solutions in the embodiments of the present invention are clearly and completely described below with reference to the accompanying drawings in the embodiments of the present invention. Obviously, the described embodiments are merely some embodiments of the present invention, rather than all embodiments. Based on the embodiments of the present invention, all other embodiments obtained by a person of ordinary skill in the art without creative efforts shall fall within the scope of protection of the present invention.

It should be noted that the terms "first", "second", etc. in the description and claims of the present invention and the drawings are used to distinguish similar objects and are not necessarily used to describe a specific order or sequence. It should be understood that the data so used are interchangeable under appropriate circumstances, so that the embodiments of the present invention described herein are capable of being practiced in orders other than those illustrated or described herein. Furthermore, the terms "including" and "having" and any variations thereof are intended to cover non-exclusive inclusions, for example, processes, methods, apparatuses, products or devices that comprise a series of steps or units need not be limited to those explicitly listed, and may include other steps or elements not expressly listed or inherent to the processes, methods, products or devices.

In order to make the objectives, technical solutions and advantages disclosed in the embodiments of the present invention clearer, the embodiments of the present invention are further described in detail below with reference to the drawings and examples. It should be understood that the specific embodiments described herein are only used to explain the embodiments of the present invention and are not used to limit the embodiments of the present invention.

The method provided by the embodiment of the present invention can be applied to a scenario of dubbing non-player characters in a game. Because it is impossible for a dubbing actor to be proficient in all languages, a voice conversion technology can be used to use a voice of the dubbing actor to dub the game characters in different language versions. For example, the dubbing actor can use a first language to dub a game character of a first language version of the game, and for a game character of a second language version of the game, a speech of the first language dubbed by the dubbing actor can be used as a reference speech, combined with a target speech of the second language, the voice conversion technology is used to clone a voiceprint of the dubbing actor to the target speech, so that a speech that the voice of the dubbing actor is used to dub the game character in the second language version of the game is obtained.

It should be noted that, the above application scenario is only exemplary. In actual applications, the method provided by the embodiment of the present invention can further be applied to other scenarios that require voice conversion, such as film and television dubbing scenes or voice broadcasting scenes, and the present invention does not impose any specific limitations on this. The method provided by the embodiment of the present invention is described in detail below by taking the application in the scenario of dubbing non-player characters in a game as an example.

According to the voice conversion method of some embodiments, acoustic features and a vocoder can be used for voice conversion: first, an automatic speech recognition (Automatic Speech Recognition, ASR) technology is used to analyze a source speech to obtain phonetic posteriorgram (Phonetic Posteriorgram, PPG) features of the source speech, and then the PPG features are input to a conversion model to obtain acoustic speech parameters to be sent to the vocoder, and finally the vocoder converts the source speech into a target speech according to the speech acoustic features.

According to the voice conversion method of some embodiments, a phonetic symbol mapping method can be used to map non-native phonetic symbols into a native phonetic symbol system, and then a native speech synthesizer is used to synthesize a speech. However, because the mapping relationship between phonetic symbols is only based on simple pronunciation similarity, the synthesized non-native speech has obvious inaccuracies or even errors in pronunciation, resulting in an unnatural overall effect.

According to the voice conversion method of some embodiments, modeling can be performed by collecting multi-language data of dubbing actors, and then voice conversion is performed based on the obtained model. Most dubbing actors do not speak pure languages other than their native language, and usually speak with a heavier accent when speaking in a non-native language. Therefore, when a model obtained by training by using such data with a heavy accent is used to synthesize the non-native speech of the dubbing actor, a problem that the pronunciation is not standard enough appears, and user experience is affected. As an alternative, more professional multi-native dubbing actors can be hired, but this inevitably leads to higher data collection costs. Additionally, some popular dubbing actors may not be bilingual or multilingual, making it currently very difficult to obtain high-quality multilingual speech synthesizers for specific dubbing actors.

The above three methods all require the use of a vocoder to transform frequency domain features into time domain waveforms. This method can easily lead to a mismatch between the phonetic features inputted to the vocoder during actual voice conversion and the phonetic features used in vocoder training.

According to the voice conversion method of some embodiments, the purpose of voice conversion can be achieved by continuously and cyclically generating and discriminating the target speech through two speech generators and two discriminators based on a CycleGAN mechanism. However, unlike GAN in the image field, which can achieve high-quality image style transfer, because the speech is highly periodic and the human ear is sensitive to audio discontinuities, it is difficult for the GAN-based voice conversion method to generate high-fidelity audio.

According to the voice conversion method of some embodiments, based on VAE, an encoder responsible for converting phonetic features into latent representation and a decoder responsible for recovering phonetic features from the latent representation are trained, and the phonetic content in the latent representation is decoupled from voiceprint information of the dubbing actor, to implement voice conversion. However, the speech converted by this method has a problem of over-smoothing.

In order to solve the above problems, the embodiments of the present application provide a voice conversion method. This voice conversion method can be applied in a scenario of dubbing non-player characters in a game, so that a problem of feature mismatch occurring when a phonetic feature is converted into a time domain waveform can be avoided, and accuracy of voice conversion is improved, and long-term dependence on voice can be further established, continuity and fluency of the converted speech can be improved, it can be ensured that the converted speech is high-fidelity, and smoothness can be further suppressed at the same time, to avoid excessive smoothing in the converted speech.

It should be understood that, the method provided by embodiments of the present invention can be performed in a variety of electronic devices, such as mobile terminals, computer terminals, servers, or similar computing devices and systems. Specifically, the electronic device may include a memory, a processor, and a computer program stored on the memory. The processor executes the computer program to implement the voice conversion method or the model training method provided by embodiments of the present invention.

The memory can be used to store a computer program and a module, and the processor executes various functional applications and data processing by running the computer program and the module stored in the memory. The memory may mainly include a program storage area and a data storage area. The program storage area may store computer programs required for an operating system and a function, etc.; the data storage area may store data created based on the use of the device, etc. In addition, the memory may include a high-speed random access memory and may further include a non-volatile memory, such as at least one magnetic disk storage device, a flash memory device, or another volatile solid-state storage device. Correspondingly, the memory may further include a memory controller to provide the processor with access to the memory.

Referring to FIG. 1 of the description, FIG. 1 is a schematic structural diagram of hardware of an electronic device according to an embodiment of the present invention. As shown in FIG. 1, the electronic device may be a server 100. The server 100 may vary greatly due to different configurations or performance, and may include one or more central processing units (Central Processing Unit, CPU) 110 (for example, one or more processors) and a memory 130, one or more storage media 120 (for example, one or more mass storage devices) that stores computer application programs 123 or data 122. The memory 130 and the storage medium 120 can be short-term storage or persistent storage. The program stored in the storage medium 120 may include one or more modules, and each module may include a series of instruction operations in the server. Furthermore, the central processing unit 110 may be configured to communicate with the storage medium 120 and execute a series of instruction operations in the storage medium 120 on the server 100. The server 100 may further include one or more power supplies 160, one or more wired or wireless network interfaces 150, one or more input and output interfaces 140, and/or one or more operating systems 121 stored in the storage medium 120, such as Windows Server™, Mac OS X™, Unix™, Linux™, and FreeBSD™.

The person skilled in the art can understand that the structure shown in FIG. 1 is only exemplary, and the server 100 may further include more or fewer components than that shown in FIG. 1, or may implement the same functions but have different configurations from that shown in FIG. 1.

Figure 2:
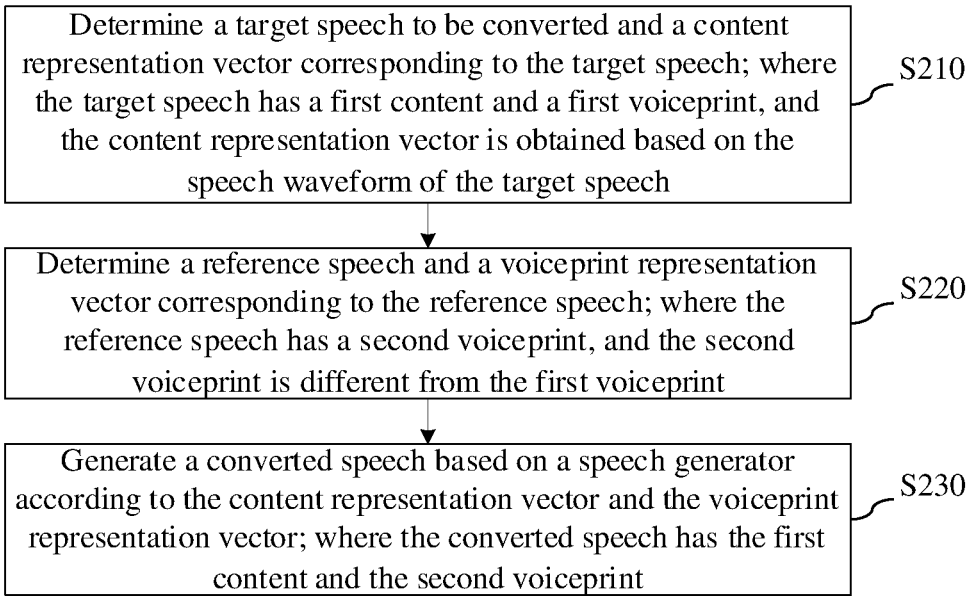
FIG. 2 is a flow chart of a voice conversion method according to an embodiment of the present invention.

Referring to FIG. 2 of the description, FIG. 2 is a flow of a voice conversion method according to an embodiment of the present invention. This method can be applied to a processor of an electronic device. Specifically, as shown in FIG. 2, the method may include the following steps:

S210: A content representation vector determining step: Determine a target speech to be converted and a content representation vector corresponding to the target speech. The target speech has a first content and a first voiceprint, and the content representation vector is obtained based on the speech waveform of the target speech.

In the content representation vector determining step S210, the target speech to be converted may be a speech having the first content and the first voiceprint, for example, may be a speech dubbed by an ordinary native speaker (a voiceprint of a speech of an ordinary native speaker as an example of the first voiceprint) according to a script (as an example of the first content), or a speech (a voiceprint of a speech in a voice library of the target speech synthesized as another example of the first voiceprint) synthesized by means of a Text to Speech (TTS) technology based on the target text to be converted (as another example of the first content). The content representation vector may be a content representation vector obtained directly based on the speech waveform of the target speech.

Optionally, the content representation vector determining step S210 may include: determining the speech waveform of the target speech; and inputting the speech waveform of the target speech into a content encoder to obtain the corresponding content representation vector.

Specifically, after obtaining the target speech to be converted, the speech waveform of the target speech can be input into the pre-trained content encoder, and the content encoder encodes the speech waveform of the target speech into the corresponding content representation vector.

Figure 3:
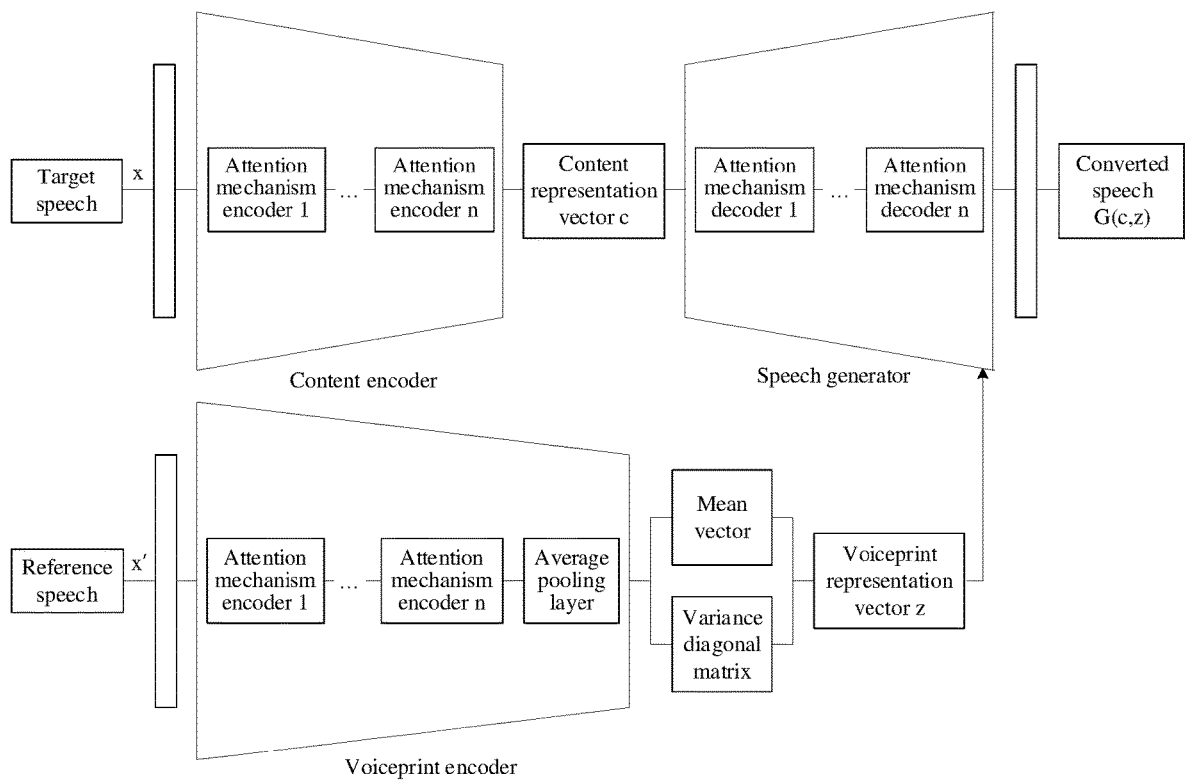
FIG. 3 is a schematic diagram of a model structure according to an embodiment of the present invention.

Optionally, with reference to FIG. 3 of the description, the content encoder may be an encoder based on an attention mechanism, for example, may be formed by stacking an attention mechanism encoder 1 to an attention mechanism encoder n shown exemplarily in FIG. 3. An input of the content encoder may be the speech waveform of the target speech, and an output may be the content representation vector corresponding to the target speech. Each attention mechanism encoder may be a Transformer encoder, and an output dimension of each Transformer encoder gradually becomes smaller, so that the down-sampling process is completed. The number of attention mechanism encoders in the content encoder can be preset according to actual needs, and the embodiment of the present invention does not impose any specific limitations on this. A specific training process of the content encoder is described in detail later.

It can be understood that, the content representation vector is obtained by extracting the waveform of the target speech through the Transformer encoder based on an attention mechanism, rather than by extracting the phonetic feature of the target speech, so that a problem of feature mismatch occurring in the subsequent conversion of a frequency domain content feature into a time domain waveform can be avoided.

S220: A voiceprint representation vector determining step: Determine a reference speech and a voiceprint representation vector corresponding to the reference speech. The reference speech has a second voiceprint, and the second voiceprint is different from the first voiceprint.

In the voiceprint representation vector determining step S220, the reference speech may be a speech having second content and a second voiceprint, and for example, may be a speech (a voiceprint of a speech of a dubbing actor as an example of the second voiceprint) dubbed by the dubbing actor according to a script (as an example of the second content). Because different people's voices have different voiceprints (timbres), the second voiceprint is different from the first voiceprint of the target speech. The second content and the first content of the target speech may be the same or different. Preferably, the second content is different from the first content.

Optionally, the voiceprint representation vector can be determined based on a speech feature of the reference speech. The voiceprint representation vector determining step S220 may include: extracting a Mel-Spectrogram (Mel-Spectrogram) feature of the reference speech; inputting the Mel-Spectrogram feature into a voiceprint encoder to obtain a corresponding mean vector and a variance diagonal matrix; and determining the voiceprint representation vector corresponding to the reference speech based on the mean vector and the variance diagonal matrix.

Specifically, the Mel-Spectrogram feature of the reference speech can be extracted by using the existing speech feature extraction algorithm. Details are not described herein in the embodiment of the present invention.

Specifically, after obtaining the Mel-Spectrogram feature of the reference speech, the Mel-Spectrogram feature can be input into a pre-trained voiceprint encoder, and the voiceprint encoder encodes the Mel-Spectrogram feature into the corresponding voiceprint representation vector. Assuming that p(z|x) obeys the conditionally independent Gaussian distribution, the voiceprint encoder takes the inputted Mel-Spectrogram feature of the reference speech as an input, and outputs a mean vector $\mu$ and a variance diagonal matrix $\sigma^2 I$, so that the voiceprint representation vector $z \sim N(\mu, \sigma^2 I)$ corresponding to the reference speech can be obtained, that is, $z = \mu + \sigma \cdot \varepsilon$, where $\varepsilon \sim N(0, I)$.

Optionally, with reference to FIG. 3 of the description, the voiceprint encoder may be an encoder based on an attention mechanism, for example, may be formed in a way in which an attention mechanism encoder 1 to an attention mechanism encoder n as exemplarily shown in FIG. 3 are stacked and then are connected to an average pooling layer. An input of the voiceprint encoder may be the Mel-Spectrogram feature of the reference speech, and an output may be a mean vector and a variance diagonal matrix corresponding to the reference speech. Each attention mechanism encoder may be a Transformer encoder, that is, the voiceprint encoder may include multiple Transformer encoders and the average pooling layer (Average Pooling). The number of attention mechanism encoders in the voiceprint encoder may be preset according to actual needs, and the embodiment of the present invention does not impose any specific restrictions on this. A specific training process of the voiceprint encoder is described in detail later.

It should be noted that the target speech can be the speech in various languages, and the reference speech can also be the speech in various languages. The embodiment of the present invention does not impose any specific restrictions on this. Specifically, the reference speech and the target speech may be speeches in the same language or may be speeches in different languages. Preferably, the reference speech and the target speech are speeches in different languages.

It can be understood that, because the content and the voiceprint of the speech are separately encoded in the embodiment of the present invention, based on the content encoding result of the target speech, the voiceprint encoding result of the reference speech is used for constraints to generate a converted speech, so that the voiceprint of the reference speech is cloned to the speech waveform of the target speech. Therefore, the language of the target speech is not limited in the embodiment of the present invention, and voice conversion in the case of mixed expressions in multiple languages can be supported.

S230: A voice conversion step: Generate a converted speech based on a speech generator according to the content representation vector and the voiceprint representation vector. The converted speech has the first content and the second voiceprint.

In the voice conversion step S230, the content representation vector and the voiceprint representation vector can be input into a pre-trained speech generator, and the speech generator generates the speech waveform of the converted speech according to the content representation vector and the voiceprint representation vector, so that the converted speech having the first content and the second voiceprint is obtained. That is, the converted speech generated by the speech generator has the same content as the target speech and the same voiceprint as the reference speech, that is, the speech dubbed by the dubbing actor according to the script corresponding to the target speech can be obtained. It can be learned that, in the embodiment of the present invention, the voiceprint of the reference speech can be cloned to the target speech, so that the target speech is converted into a generated speech having the same voiceprint as the reference speech.

Optionally, the content representation vector and the voiceprint representation vector can be added as an input to the speech generator to finally obtain the converted speech.

It should be noted that, in the embodiment of the present invention, the content encoder, the voiceprint encoder, and the speech generator can all use a graphics processing unit (Graphics Processing Unit, GPU) for parallel calculation, so that the conversion rate of voice conversion is improved.

In the voice conversion step S230, the speech generator is obtained by jointly training a preset speech generation network and a preset discriminator network by using a training speech having the second voiceprint.

Optionally, the speech generator is obtained by jointly training the speech generation network and the discriminator network based on a first loss function and a second loss function by using the training speech. A value of the first loss function is calculated based on a training converted speech corresponding to the training speech. A value of the second loss function is obtained by inputting the training speech and the training converted speech corresponding to the training speech into the discriminator network to perform discrimination and calculation. The training converted speech is obtained by inputting a training content representation vector and a training voiceprint representation vector corresponding to the training speech into the speech generation network. The training content representation vector is obtained according to the speech waveform of the training speech.

It should be noted that a specific training process of the speech generator is described in detail later.

It can be understood that, the speech generator in the embodiment of the present invention can be obtained by training only by using the training speech having the second voiceprint. In a cross-language voice conversion scenario, there is no need for a corpus of the target speech language, and there is no need for a corpus of the target speech language by a dubbing actor, and therefore a problem that the corpus of the target speech language used by the dubbing actor is inadequate can be overcome. In other words, even when the corpus of the target speech language is inadequate, the voiceprint of the dubbing actor can be cloned to the target speech, and the obtained speech is high-fidelity.

Optionally, with reference to FIG. 3 of the description, the speech generator may be a decoder based on an attention mechanism, for example, may be formed by stacking an attention mechanism decoder 1 to an attention mechanism decoder n as exemplarily shown in FIG. 3. An input of the speech generator can be the content representation vector corresponding to the target speech and the voiceprint representation vector corresponding to the reference speech, and an output can be the speech waveform of the converted speech. Each attention mechanism decoder can be a Transformer decoder, and an output dimension of each Transformer decoder gradually becomes larger, so that the up-sampling process is completed. The number of attention mechanism decoders in the speech generator can be preset according to actual needs, and the embodiment of the present invention does not impose any specific restrictions on this.

It can be understood that, the speech waveform is encoded and decoded by using the Transformer encoder/decoder based on an attention mechanism, the long-term dependence of the speech can be established, so that the converted speech is more continuous and more natural, and authenticity and fluency of the converted speech are improved.

It should be noted that, the implementation of constructing the content encoder, the voiceprint encoder, and the speech generator through the Transformer encoder/decoder is only an example. In some possible embodiments, other neural networks or other encoding networks based on an attention mechanism (such as Transformer-based derivative networks) can also be used to constitute the content encoder, the voiceprint encoder, and the speech generator, and the embodiment of the present invention does not impose any specific restrictions on this.

In a possible embodiment, after obtaining the voiceprint representation vector, the method may further include: performing 1×1 convolution on the voiceprint representation vector to obtain one or more convolved voiceprint representation vectors. A dimension of each convolved voiceprint representation vector is at least the same as an input dimension of one decoder in the speech generator.

Correspondingly, the voice conversion step S230 may specifically include: inputting the content representation vector and the one or more convolved voiceprint representation vectors into the speech generator to obtain the converted speech.

Specifically, because the input dimensions of the decoders in the speech generator may be different, before the voiceprint representation vector is input into the speech generator, 1×1 convolution may be first performed on the voiceprint representation vector for multiple times, so that the one or more voiceprint representation vectors having the same dimensions as the input dimensions of the decoders in the speech generator are obtained, and input into the speech generator.

Correspondingly, in the voice conversion step S230, the speech generator may generate the speech waveform of the converted speech according to the one or more convolved voiceprint representation vectors and the content representation vector, so that the converted speech having the first content and the second voiceprint is obtained. An input of the first decoder in the speech generator may include a voiceprint representation vector having the same dimension as the input dimension of the first decoder and a content representation vector, and an input of each decoder other than the first decoder in the speech generator may include the voiceprint representation vector having the same dimension as the input dimension of each decoder other than the first decoder and an output result of the previous-layer decoder.

Figure 4:
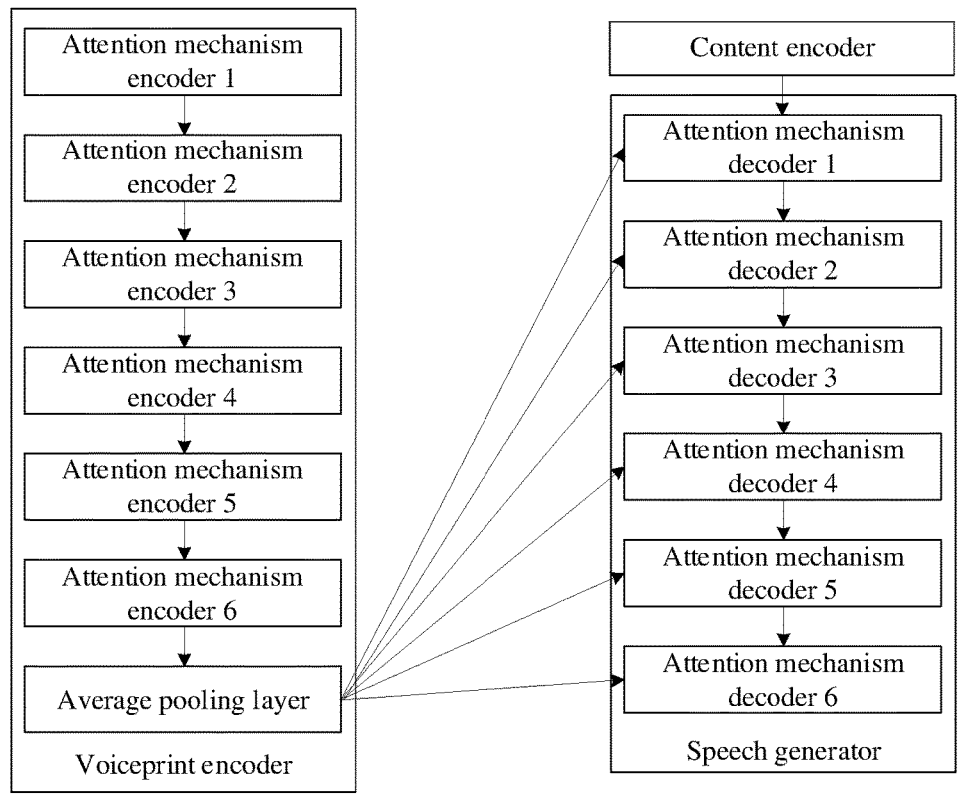
FIG. 4 is a schematic diagram of a model structure according to another embodiment of the present invention.

For example, with reference to FIG. 4 of the description, assuming that the speech generator includes decoders of two different dimensions (for example, attention mechanism decoders 1-3 are decoders of the first dimension, and attention mechanism decoders 4-6 are decoders of the second dimension), the voiceprint representation vectors of two different dimensions, that is, the first dimension and the second dimension, can be obtained through a 1×1 convolution operation, and the content representation vector output by the content encoder and the voiceprint representation vectors of the above two different dimensions can be input into the speech generator.

Correspondingly, the speech generator can add the content representation vector and the first-dimensional voiceprint representation vector as an input of the attention mechanism decoder 1, and obtain an output result. The speech generator can add the output result of the attention mechanism decoder 1 and the first-dimensional voiceprint representation vector as an input of the attention mechanism decoder 2, and can obtain an output result. The speech generator can add the output result of the attention mechanism decoder 2 and the first-dimensional voiceprint representation vector as an input of the attention mechanism decoder 3, and can obtain an output result. The speech generator can add the output result of the attention mechanism decoder 3 and the second-dimensional voiceprint representation vector as an input of the attention mechanism decoder 4, and obtain an output result; by analogy, the converted speech can finally be obtained.

In a possible embodiment, the content representation vector and the voiceprint representation vector can be directly input into the speech generator. The speech generator first performs 1×1 convolution on the voiceprint representation vector to obtain one or more voiceprint representation vectors having the same dimension as the input dimension of each decoder in the speech generator, and then generates the speech waveform of the converted speech according to the one or more convolved voiceprint representation vectors and the content representation vector, to further obtain the converted speech having the first content and the second voiceprint. In the embodiment of the present invention, a specific implementation method of each step is similar to the embodiment of first performing convolution operation and then inputting to the speech generator. Details are not described herein in the embodiment of the present invention.

In conclusion, according to the voice conversion method in the embodiment of the present invention, the content and the voiceprint of the target speech and the reference speech are separately encoded, and waveform generation is performed by using a pre-trained speech generator according to the content representation vector obtained based on the speech waveform of the target speech and the voiceprint representation vector of the reference speech, so that the voiceprint encoding result of the reference speech can be directly used for constraints on the waveform of the target speech to generate a waveform of the converted speech, and there is no need to use the phonetic feature of the target speech, so that a problem of feature mismatch occurring when the phonetic feature is converted into a time domain waveform can be avoided, and accuracy of voice conversion is improved.

A specific training process of the content encoder, the voiceprint encoder, and the speech generator provided in the above embodiment is described in detail below.

Figure 5:
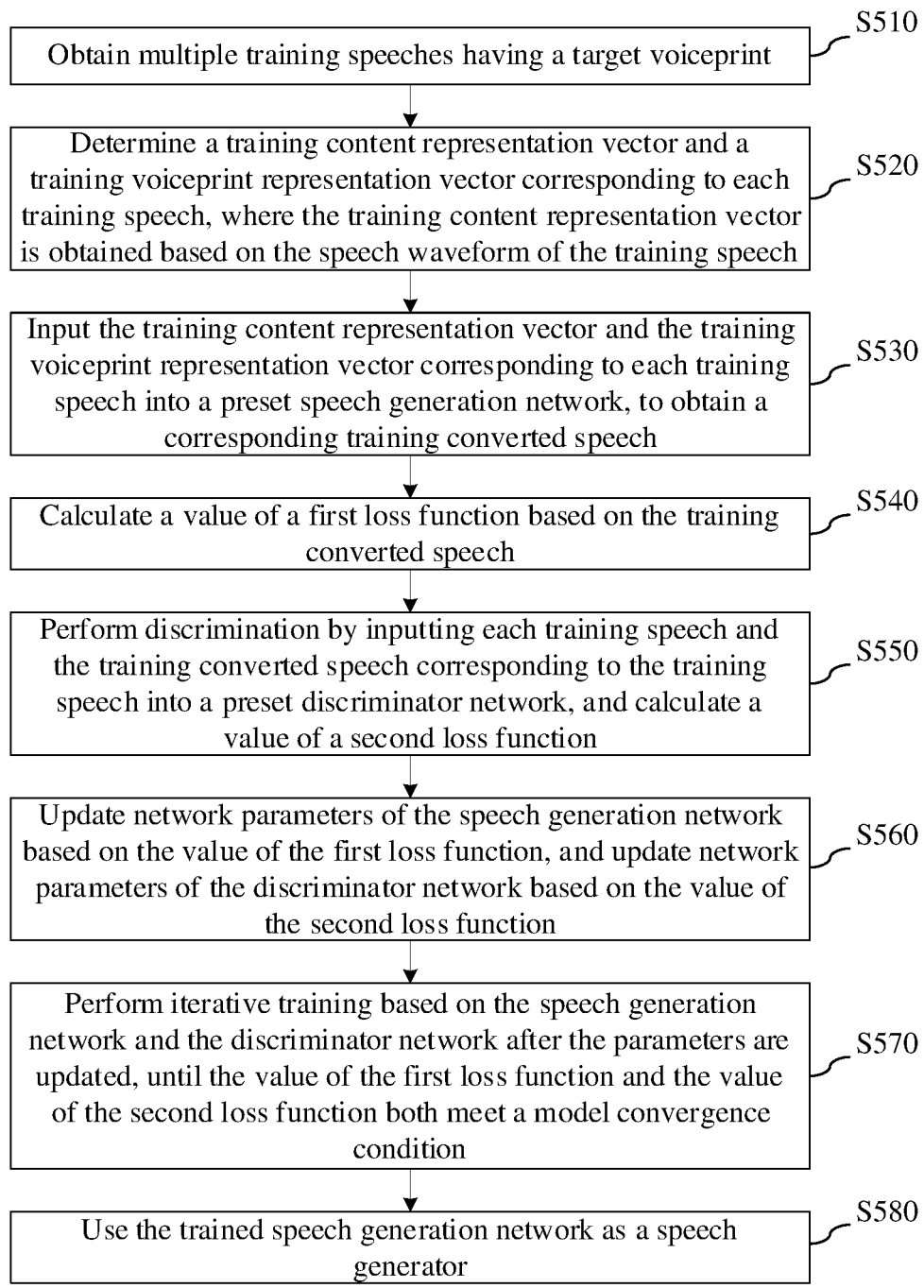
FIG. 5 is a flow chart of a model training method according to an embodiment of the present invention.

Referring to FIG. 5 of the description, FIG. 5 is a flow of a model training method according to an embodiment of the present invention. This method can be applied to a processor of an electronic device. Specifically, as shown in FIG. 5, the method may include the following steps:

S510: A training speech obtaining step: Obtain multiple training speeches having a target voiceprint (as an example of a second voiceprint).

In the training speech obtaining step S510, multiple speeches having the second voiceprint but different content can be obtained as training speeches. The training speeches can be speeches in the same language or can be speeches in different languages, and the embodiment of the present invention does not impose any specific restrictions on this. For example, multiple speeches obtained from the dubbing actor by performing dubbing according to scripts can be obtained as the training speeches.

It can be understood that, in the embodiment of the present invention, the content encoder, the voiceprint encoder, and/or the speech generator can be trained only by using the training speeches having the second voiceprint, in a cross-language voice conversion scenario, there is no need for a corpus of the target speech language, and there is no need for a corpus of the target speech language by the dubbing actor, and therefore a problem that the corpus of the target speech language used by the dubbing actor is inadequate can be overcome.

S520: A training representation vector determining step: Determine a training content representation vector and a training voiceprint representation vector corresponding to each training speech. The training content representation vector is obtained based on the speech waveform of the training speech.

In the training representation vector determining step S520, the training content representation vector corresponding to each training speech can be a content representation vector obtained directly based on the speech waveform of the training speech, and the training voiceprint representation vector corresponding to each training speech can be a voiceprint representation vector determined based on a speech feature of the training speech.

Optionally, a corresponding training content representation vector can be obtained by inputting the speech waveform of each training speech into a pre-trained content encoder. A corresponding mean vector and variance diagonal matrix can be obtained by inputting a Mel-spectrogram feature of each training speech into a pre-trained voiceprint encoder, and a corresponding training voiceprint representation vector can be further obtained.

It should be noted that, in practical applications, the training content representation vector and the training voiceprint representation vector corresponding to each training speech can be determined by other methods of the prior art, and the embodiment of the present invention does not impose any specific restrictions on this.

S530: A training speech conversion step: Input the training content representation vector and the training voiceprint representation vector corresponding to each training speech into a preset speech generation network, to obtain a corresponding training converted speech.

In the training speech conversion step S530, a speech generation network may be pre-constructed. The speech generation network may be a decoding network based on an attention mechanism, for example, may be formed by stacking an attention mechanism decoder 1 to an attention mechanism decoder n as exemplarily shown in FIG. 6. An input of the speech generation network can be the training content representation vector and the training voiceprint representation vector corresponding to the training speech, and an output can be the speech waveform of the training converted speech. Each attention mechanism decoder can be a Transformer decoder, and an output dimension of each Transformer decoder gradually becomes larger, so that the upsampling process is completed. The number of attention mechanism decoders in the speech generation network can be preset according to actual needs, and the embodiment of the present invention does not impose any specific restrictions on this.

In the training speech conversion step S530, the network parameters of the pre-constructed speech generation network can be randomly initialized first, and then the training content representation vector and the training voiceprint representation vector corresponding to each training speech can be input into the speech generation network, to obtain the corresponding training converted speech.

Optionally, the training content representation vector and the training voiceprint representation vector can be added as an input of the speech generation network, and the training converted speech after conversion is finally obtained.

In a possible embodiment, after the training content representation vector and the training voiceprint representation vector are obtained, 1×1 convolution may be performed on the training voiceprint representation vector, to obtain one or more convolved training voiceprint representation vectors, the generated one or more convolved training voiceprint representation vectors and the training content representation vector are input into the speech generation network, and the speech generation network generates the speech waveform of the training converted speech, and then obtains the training converted speech after conversion. A dimension of each convolved training voiceprint representation vector is at least the same as an input dimension of one decoder in the speech generation network.

Specifically, an input of a first decoder in the speech generation network may include a training voiceprint representation vector having the same dimension as the input dimension of the first decoder and a training content representation vector, and an input of each decoder other than the first decoder in the speech generation network can include a training voiceprint representation vector having the same dimension as the input dimension of each decoder other than the first decoder and an output result of the previous-layer decoder.

For example, the training voiceprint representation vector having the same dimension as the input dimension of the first decoder and the training content representation vector can be added as an input of the first decoder in the speech generation network, and the training voiceprint representation vector having the same dimension as the input dimension of each decoder other than the first decoder and an output result of the previous-layer decoder are added as an input of each decoder other than the first decoder.

In a possible embodiment, when the speech generation network includes multiple decoders, the training content representation vector and the training voiceprint representation vector can be directly input into the speech generation network, and the speech generation network first performs 1×1 convolution on the training voiceprint representation vector, to obtain one or more training voiceprint representation vectors having the same dimension as the input dimension of each decoder in the speech generation network, and then generates the speech waveform of the training converted speech according to the one or more convolved training voiceprint representation vectors and the training content representation vector, and further obtains the training converted speech after conversion. In the embodiment of the present invention, the specific implementation method of each step is similar to the embodiment of first performing the convolution operation and then inputting into the speech generation network. Details are not described herein in the embodiment of the present invention.

S540: A first calculation step: Calculate a value of a first loss function based on the training converted speech.

In the embodiment of the present invention, model training may be performed through a GAN-based method. The core principle of GAN is as follows: The generator generates data for the discriminator to determine whether the generated data is true or false. Until the discriminator cannot distinguish between the generated data and the original data, the training is completed. Therefore, the loss function in the embodiment of the present invention may include two parts: the first loss function corresponding to the generator and the second loss function corresponding to the discriminator.

In the first calculation step S540, the pre-constructed speech generation network can be regarded as a generator in the GAN to train the speech generation network by using the training content representation vector and the training voiceprint representation vector corresponding to each training speech. In this case, the first loss function including only a loss function corresponding to the speech generation network can be constructed in advance. During the training process, the value of the first loss function can be calculated based on the training converted speech.

S550: A second calculation step: Perform discrimination by inputting each training speech and the training converted speech corresponding to the training speech into a preset discriminator network, and calculate a value of a second loss function.

In the second calculation step S550, a discriminator network can be pre-constructed, and the discriminator network can be regarded as a discriminator in the GAN, to perform joint training with the generator in the GAN.

Figure 6:
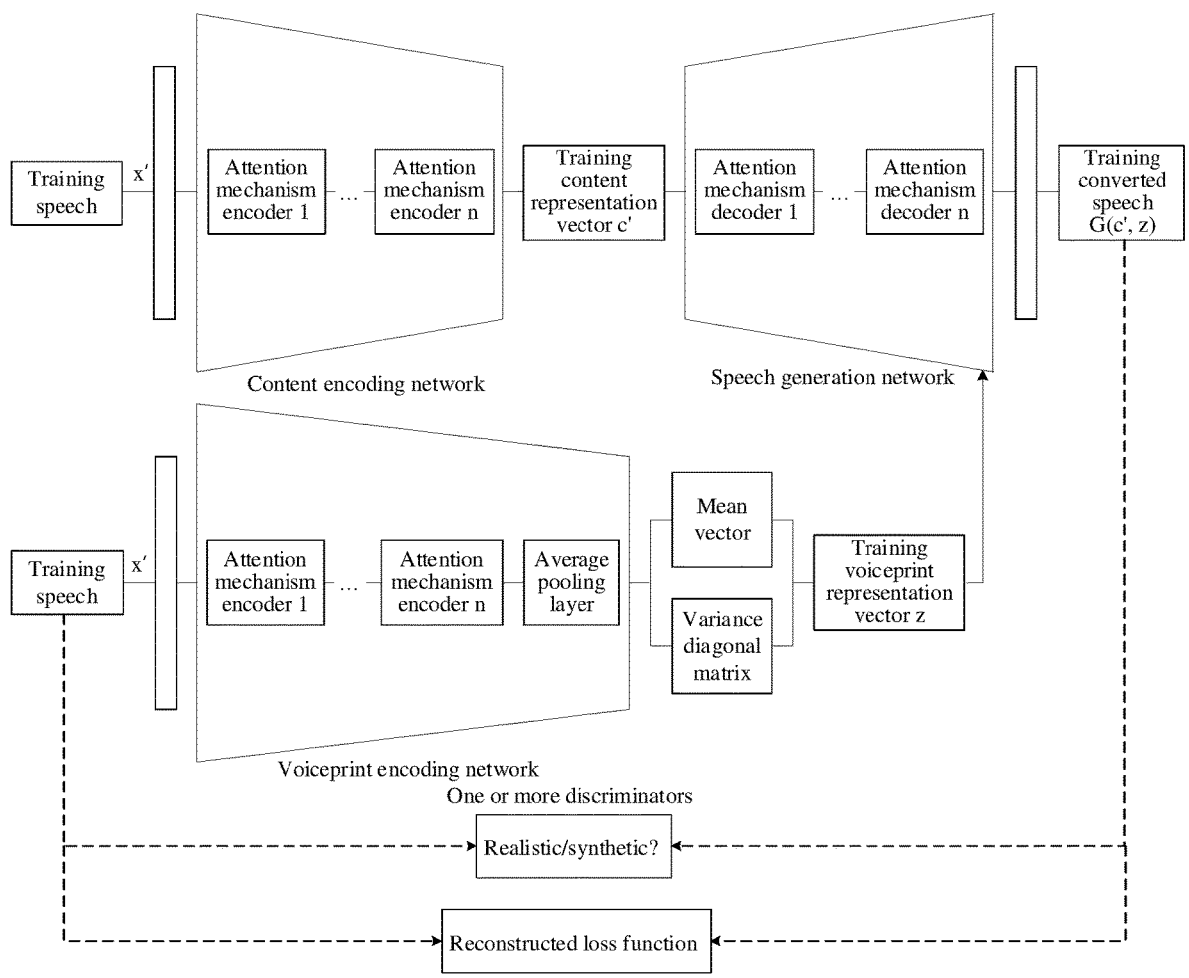
FIG. 6 is a schematic diagram of a model structure according to another embodiment of the present invention.

Optionally, referring to FIG. 6 of the description, the discriminator network may include one or more discriminators used for determining whether the speech generated by the speech generation network is synthesized. An input of the discriminator network may be the training speech and the training converted speech generated by the speech generation network according to the training content representation vector and the training voiceprint representation vector corresponding to the training speech, and an output may be a discrimination result of determining whether the training converted speech is a synthetic speech. The number of discriminators in the discriminator network can be preset according to actual needs, and the embodiment of the present invention does not impose any specific restrictions on this.

Optionally, in order to make it impossible to determine whether the generated speech is a synthetic speech at different time resolutions, the number of discriminators in the discriminator network is preferably multiple, and the multiple discriminators are used to determine whether the speech generated by the speech generation network is synthesized at different time resolutions. The multiple discriminators can perform discrimination on output results of different stacking numbers of decoders, that is, the output results of different layers of decoders can be obtained respectively, and the output result is used as an input of each discriminator and is used as an input of the next layer of decoder.

For example, assuming that the speech generation network is formed by stacking 10 Transformer decoders, and the discriminator network includes three discriminators, the three Transformer decoders can be randomly selected, so that the three discriminators perform discrimination on the output results of the three selected Transformer decoders respectively. Assuming that the $2^{nd}$, $5^{th}$, and $10^{th}$ Transformer decoders are randomly selected, the three discriminators can perform discrimination on the output results of the $2^{nd}$, $5^{th}$, and $10^{th}$ Transformer decoders respectively.

It should be noted that, the number of discriminators in the discriminator network can be set according to an actual situation. For example, three discriminators with different time resolutions can be used by combining inference time overhead and calculation overhead, but the number of discriminators can also be larger or smaller, and the embodiment of the present invention does not impose any specific restrictions on this.

In the second calculation step S550, the second loss function corresponding to the discriminator network can also be pre-constructed. During the training process, the network parameters of the pre-constructed discriminator network can be randomly initialized, and then each training speech and a corresponding training converted speech corresponding to each training speech can be input into the discriminator network for discrimination, and a value of a second loss function can be obtained by calculation.

It can be understood that, in the embodiment of the present invention, each discriminator compares the training converted speech generated by the speech generation network and the training speech corresponding to the training converted speech, rather than phonetic features or language features of the speech, so that a problem of being highly dependent on accuracy of the above feature extraction is avoided, accuracy of the determining of the discriminator is improved, and the voice conversion effect of the trained speech generator is further improved. In addition, the training of the discriminator does not require a corpus of the target speech language, so that dependence on the target speech language data can be reduced.

S560: A parameter updating step: Update network parameters of the speech generation network based on the value of the first loss function, and update network parameters of the discriminator network based on the value of the second loss function.

In the parameter updating step S560, backpropagation can be performed on the speech generation network by using a backpropagation algorithm according to the value of the first loss function obtained by calculation, to update the network parameter of the speech generation network; backpropagation can be performed on the discriminator network by using a backpropagation algorithm according to the value of the second loss function obtained by calculation, to update the network parameter of the discriminator network. For the specific content of performing backpropagation to update the model parameter, reference may be made to the prior art. Details are not described herein in the embodiments of the present invention.

S570: An iterative training step: Perform iterative training based on the speech generation network and the discriminator network after the parameters are updated, until the value of the first loss function and the value of the second loss function both meet a model convergence condition.

Specifically, steps S520 to S560 can be repeated, and iterative training is performed on the speech generation network and the discriminator network for multiple times by using the training speech, to update the network parameters, until the value of the first loss function and the value of the second loss function both meet the model convergence condition.

The model convergence condition can be predetermined according to an actual need. For example, the model convergence condition can be that the value of the first loss function is less than or equal to a preset first loss threshold, and the value of the second loss function is less than or equal to a preset second loss threshold. That is, the value of the first loss function and the value of the second loss function obtained by calculation can be compared with the first loss threshold and the second loss threshold respectively. If the value of the first loss function is greater than the first loss threshold, it can be determined that the value of the first loss function does not meet the model convergence condition; on the contrary, it can be determined that the value of the first loss function meets the model convergence condition; if the value of the second loss function is greater than the second loss threshold, it can be determined that the value of the second loss function does not meet the model convergence condition; on the contrary, it can be determined that the value of the second loss function meets the model convergence condition.

S580: A generator determining step: Use the trained speech generation network as a speech generator.

Specifically, after the training is completed, the finally obtained speech generation network can be used as the speech generator obtained by training.

Figure 7:
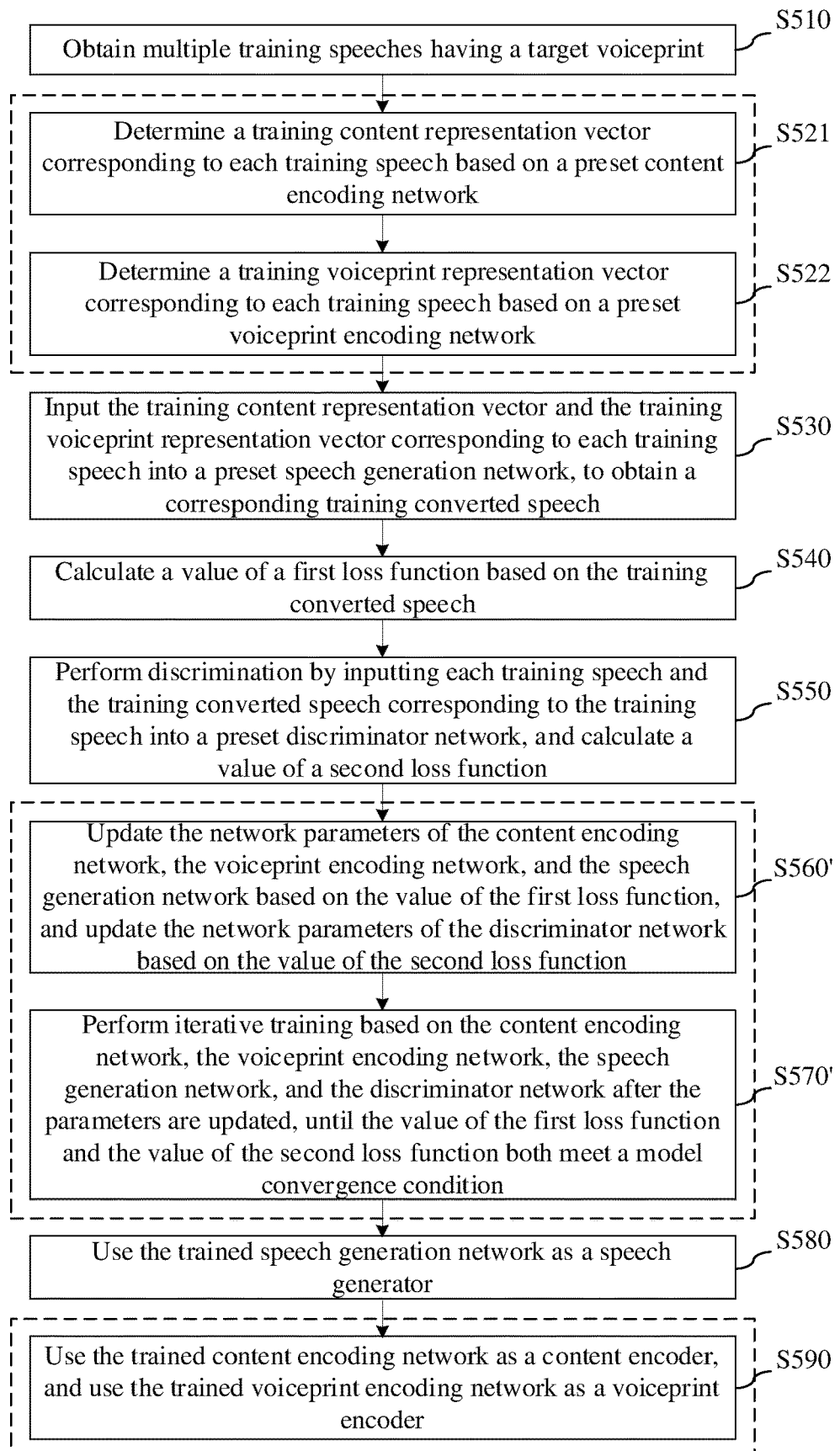
FIG. 7 is a flow chart of a model training method according to another embodiment of the present invention.

In a possible embodiment, with reference to FIG. 7 of the description, the training representation vector determining step S520 may include the following steps:

S521: Determine a training content representation vector corresponding to each training speech based on a preset content encoding network.

S522: Determine a training voiceprint representation vector corresponding to each training speech based on a preset voiceprint encoding network.

In step S521, a content encoding network may be pre-constructed. The content encoding network may be an encoding network based on an attention mechanism, for example, may be formed by stacking the attention mechanism encoder 1 to the attention mechanism n as exemplarily shown in FIG. 6. An input of the content encoding network can be the speech waveform of the training speech, and an output can be the training content representation vector corresponding to the training speech. Each attention mechanism encoder can be a Transformer encoder, and an output dimension of each Transformer encoder gradually becomes smaller, so that the down-sampling process is completed. The number of attention mechanism encoders in the content encoding network can be preset according to actual needs, and the embodiment of the present invention does not impose any limitations on this.

In step S521, the network parameters of the pre-constructed content encoding network can be randomly initialized first, and then the speech waveform of each training speech is input into the content encoding network, and the content encoding network encodes the speech waveform of the training speech into the corresponding training content representation vector.

It can be understood that, the training content representation vector is obtained by extracting the waveform of the training speech through the Transformer encoder based on an attention mechanism, rather than by extracting the phonetic feature of the training speech, so that a problem of feature mismatch occurring in subsequent conversion of a frequency domain content feature into a time domain waveform can be avoided.

In step S522, a voiceprint encoding network may be pre-constructed. The voiceprint encoding network may be an encoding network based on an attention mechanism, for example, may be formed in a way in which the attention mechanism encoder 1 to the attention mechanism encoder n as exemplarily shown in FIG. 6 are stacked, and then are connected to an average pooling layer. An input of the voiceprint encoding network can be a Mel-spectrogram feature of the training speech, and an output can be a mean vector and a variance diagonal matrix corresponding to the training speech. Each attention mechanism encoder can be a Transformer encoder, that is, the voiceprint encoding network can include multiple Transformer encoders and the average pooling layer. The number of attention mechanism encoders in the voiceprint encoding network can be preset according to actual needs, and the embodiment of the present invention does not impose any restrictions on this.

In step S522, the network parameters of the pre-constructed voiceprint encoding network can be can be first randomly initialized, then the Mel-spectrogram feature of each training speech can be extracted, and the Mel-spectrogram feature of each training speech can be input into the voiceprint encoding network, to obtain a corresponding mean vector and variance diagonal matrix, and the training voiceprint representation vector corresponding to each training speech can be determined based on the corresponding mean vector and variance diagonal matrix.

It can be understood that, the speech waveform is encoded and decoded by using the Transformer encoder/decoder based on an attention mechanism, a weight of a more important feature is higher, and the long-term dependence of the speech can be established, so that the converted speech becomes more continuous and more natural, and authenticity and fluency of the converted speech are improved.

It should be noted that, the implementation of constructing a content encoding network, a voiceprint encoding network, and a speech generation network by using a Transformer encoder/decoder is only an example. In some possible embodiments, another neural network or another encoding network based on an attention mechanism (such as a derivative network based on Transformer) can also be used to form the content encoding network, the voiceprint encoding network, and the speech generation network, and the embodiment of the present invention does not impose any restrictions on this.

In the embodiment of the present invention, the pre-constructed content encoding network, the pre-constructed voiceprint encoding network, and the pre-constructed speech generation network can be used as a whole to form the generator in the GAN, to jointly train the content encoding network, the voiceprint encoding network, and the speech generation network. In this case, in the first calculation step S540, a first loss function including a loss function corresponding to the content encoding network, a loss function corresponding to the voiceprint encoding network, and a loss function corresponding to the speech generation network can be constructed in advance. During the training process, the value of the first loss function can be obtained by calculation based on the training converted speech.

Specifically, the training speech and the training converted speech generated by the speech generation network according to the training content representation vector and the training voiceprint representation vector corresponding to the training speech can be separately encoded by using the same content encoding network, and a distance between the two encodings is used as a loss function corresponding to the content encoding network, that is, a content retention loss function. The content retention loss function is as follows:

$$L_{con}(E_c, G) = E_{x',z}[\|E_c(x') - E_c(G(E_c(x'), z))\|] \quad (1)$$

Where x' represents the training speech, z represents the training voiceprint representation vector corresponding to the training speech, $E_c$ represents the content encoding network, G represents the speech generation network, and $E_{x',z[\ ]}$ represents obtaining the expectation for x' and z.

Specifically, because random sampling in the training voiceprint representation vector requires constraints of x'~N (0,1), KL (Kullback-Leibler) divergence can be used as the loss function corresponding to the voiceprint encoding network, that is, a voiceprint sampling loss function. The voiceprint sampling loss function is as follows:

$$L_{kl}(E_s) = E_{x'}[D_{kl}(p(z|x')\|N(z|0, I))] \quad (2)$$

Where x' represents the training speech, z represents the training voiceprint representation vector corresponding to the training speech, $E_s$ represents the voiceprint encoding network, $D_{kl}$ represents the KL divergence, and $E_{x'[\ ]}$ represents obtaining the expectation for x'.

Specifically, the goal of the speech generation network is to make the generated speech as close as possible to the speech spoken by a real person, that is, to reconstruct the original training speech as much as possible. Therefore, the weighted average of two types of loss functions can be used as a reconstruction loss function corresponding to the speech generation network.

The first type of loss function can be a spectral distance between the generated training converted speech and the training speech. The spectral distance is as follows:

$$L_{spe}^{(w)}(E_c, E_s, G) = E_{c',z,x'}[\|\theta(x', w) - \theta(G(x', z), w)\|_2] \quad (3)$$

Where x' represents the training speech, c' represents the training content representation vector corresponding to the training speech, z represents the training voiceprint representation vector corresponding to the training speech, and $\theta(\cdot)$ represents the Mel-spectrogram feature of the speech extracted by using Fast Fourier Transform (Fast Fourier Transform, FFT), w represents the number of FFT points, $E_c$ represents the content encoding network, $E_s$ represents the voiceprint encoding network, G represents the speech generation network, $\|\cdot\|_2$ represents the $L_2$ norm, $E_{c',z,x'[\ ]}$ represents obtaining the expectation for c', z and x'.

Because the speech generation network should make the discrimination of the training converted speech corresponding to the training speech by the discriminator network closer to the discrimination of real speech, a discrimination distance of the discriminator network on the training speech and the training converted speech corresponding to the training speech can be used as the second type of loss function, that is, a feature matching loss function. The feature matching loss function corresponding to the $k^{th}$ discriminator in the discriminator network is as follows:

$$L_{fm}^{(k)}(E_c, E_s, G) = E_{c',z,x'}[\|D^{(k)}(x') - D^{(k)}(G(c', z))\|_1] \quad (4)$$

Where x' represents the training speech, c' represents the training content representation vector corresponding to the training speech, z represents the training voiceprint representation vector corresponding to the training speech, G represents the speech generation network, $D^{(k)}$(k=1, ..., n) represents the $k^{th}$ discriminator in the discriminator network, n represents the number of discriminators in the discriminator network, $\|\cdot\|_1$ represents the $L_1$ norm, $E_{c',z,x'[\ ]}$ means obtaining the expectation for c', z, and x'.

Therefore, a reconstruction loss function corresponding to the speech generation network can be expressed as follows:

$$L_{rec}(E_c, E_s, G) = \sum_{k=1}^{n} L_{fm}^{(k)}(E_c, E_s, G) + \beta \sum_{w} L_{spe}^{(w)}(E_c, E_s, G) \quad (5)$$

Where $\beta$ represents the weight coefficient corresponding to the spectral distance between the training converted speech and the training speech, and n represents the number of discriminators in the discriminator network.

In addition, the speech generation network also needs to make the discriminator network unable to determine whether the generated training converted speech is synthetic. Therefore, an adversarial loss function that competes against the discriminator network is also needed. As the adversarial loss function corresponding to the speech generation network, the adversarial loss function is as follows:

$$L_{adv}(E_c, E_s, G) = \sum_{k=1}^{n} E_{c',z}[\log(1 - D^{(k)}(G(c', z)))] \quad (6)$$

Where c' represents the training content representation vector corresponding to the training speech, z represents the training voiceprint representation vector corresponding to the training speech, G represents the speech generation network, $D^{(k)}$(k=1, ..., n) represents the $k^{th}$ discriminator in the discriminator network, n represents the number of discriminators in the discriminator network, and $E_{c',z[\ ]}$ represents obtaining the expectation for c' and z.

In conclusion, a pre-constructed first loss function can be expressed as follows:

$$L(E_c, E_s, G) = \quad (7)$$
$$L_{adv}(E_c, E_s, G) + \lambda_{rec} L_{rec}(E_c, E_s, G) + \lambda_{con} L_{con}(E_c, G) + \lambda_{kl} L_{kl}(E_s)$$

Where $\lambda_{rec}$, $\lambda_{con}$, $\lambda_{kl}$ are respectively weight coefficients of the reconstruction loss function corresponding to the speech generation network, the content preservation loss function corresponding to the content encoding network, and the voiceprint sampling loss function corresponding to the voiceprint encoding network.

Correspondingly, in the second calculation step S550, because the purpose of the discriminator network is to correctly distinguish whether a speech segment is synthesized, cross entropy can be used as the adversarial loss function corresponding to the discriminator network. The adversarial loss function corresponding to the $k^{th}$ discriminator in the discriminator network is as follows:

$$L_{adv}(D^{(k)}) = -E_{x'}[\log(D^{(k)}(x'))] - E_{x',z}[\log(1 - D^{(k)}(G(c', z)))] \quad (8)$$

Where x' represents the training speech, c' represents the training content representation vector corresponding to the training speech, z represents the training voiceprint representation vector corresponding to the training speech, G represents the speech generation network, $D^{(k)}$(k=1, . . . , n) represents the $k^{th}$ discriminator in the discriminator network, n represents the number of discriminators in the discriminator network, $E_{x'[\ ]}$ represents obtaining the expectation for x', $E_{x',z\,[\ ]}$ represents obtaining the expectation for x' and z.

Therefore, the second loss function corresponding to the entire discriminator network can be expressed as follows:

$$L(D) = \sum_{k=1}^{n} L_{adv}(D^{(k)}) \quad (9)$$

Where $L_{adv}(D^{(k)})$ represents the adversarial loss function corresponding to the $k^{th}$ discriminator, and n represents the number of discriminators in the discriminator network.

It can be understood that, in the embodiment of the present invention, the content encoding network, the voiceprint encoding network, and the speech generation network are jointly trained by reconstructing the loss function and the discriminator, and continuity of the converted speech can be enhanced, so that the converted speech is high-fidelity, and smoothing can further be suppressed to avoid over-smoothing of the converted speech.

Specifically, when the content encoding network, the voiceprint encoding network, and the speech generation network are jointly trained, with reference to FIG. 7 of the description, the parameter updating step S560 may be as follows:

S560': Update the network parameters of the content encoding network, the voiceprint encoding network, and the speech generation network based on the value of the first loss function, and update the network parameters of the discriminator network based on the value of the second loss function.

In step S560', backpropagation may be performed on the entire generator composed of the content encoding network, the voiceprint encoding network, and the speech generation network by using a backpropagation algorithm according to the value of the first loss function obtained by calculation, to update the network parameters of the content encoding network, the voiceprint encoding network, and the speech generation network. For the specific content of performing backpropagation to update model parameters, reference may be made to the prior art. Details are not described herein in the embodiments of the present invention.

Specifically, when the content encoding network, the voiceprint encoding network and the speech generation network are jointly trained, with reference to FIG. 7 of the description, the iterative training step S570 may be as follows:

S570': Perform iterative training based on the content encoding network, the voiceprint encoding network, the speech generation network, and the discriminator network after the parameters are updated, until the value of the first loss function and the value of the second loss function both meet a model convergence condition.

In step S570', steps S521 to S560' in the embodiment shown in FIG. 7 can be repeated, and iterative training is performed on the content encoding network, the voiceprint encoding network, the speech generation network, and the discriminator network for multiple times by using the training speech to update the network parameters, until the value of the first loss function and the value of the second loss function both meet the model convergence condition. For the specific content of the model convergence condition, reference may be made to the content of the embodiment shown in FIG. 5. Details are not described herein in the embodiments of the present invention.

Specifically, when the content encoding network, the voiceprint encoding network, and the speech generation network are jointly trained, with reference to FIG. 7 of the description, the method may further include:

S590: Use the trained content encoding network as a content encoder, and use the trained voiceprint encoding network as a voiceprint encoder.

Specifically, after the training is completed, the finally obtained content encoding network can be used as the content encoder obtained by training, and the finally obtained voiceprint encoding network can be used as the voiceprint encoder obtained by training.

In conclusion, according to the model training method of the embodiment of the present invention, the content and the voiceprint of the training speech are separately encoded, the obtained training voiceprint representation vector and the training content representation vector obtained based on the speech waveform of the training speech are input into the speech generation network to train the speech generator, the training converted speech generated by the speech generation network is input into the discriminator network to train the discriminator. The speech generator obtained by training can directly obtain the waveform of the converted speech by converting according to the waveform of the target speech, and there is no need to use the phonetic feature of the target speech, so that a problem of feature mismatch occurring when the phonetic feature is converted into a time domain waveform can be avoided, and accuracy of voice conversion is improved.

Figure 8:
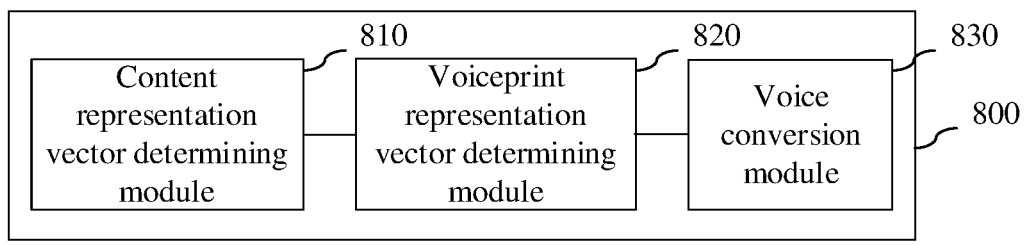
FIG. 8 is a schematic structural diagram of a voice conversion device according to an embodiment of the present invention.

Referring to FIG. 8 of the description, FIG. 8 is a structure of a voice conversion device 800 according to an embodiment of the present invention. The device 800 can be installed in an electronic device. Specifically, as shown in FIG. 8, the device 800 may include:

a content representation vector determining module 810, configured to determine a target speech to be converted and a content representation vector corresponding to the target speech; where the target speech has a first content and a first voiceprint, and the content representation vector is obtained based on the speech waveform of the target speech;

a voiceprint representation vector determining module 820, configured to determine a reference speech and a voiceprint representation vector corresponding to the reference speech, where the reference speech has a second voiceprint, and the second voiceprint is different from the first voiceprint;

a voice conversion module 830, configured to generate a converted speech based on a speech generator according to the content representation vector and the voiceprint representation vector; where the converted speech has the first content and the second voiceprint; and the speech generator is obtained by jointly training a preset speech generation network and a preset discriminator network by using a training speech having the second voiceprint.

In a possible embodiment, the device 800 may further include:

a convolution module, configured to perform 1×1 convolution on the voiceprint representation vector to obtain one or more convolved voiceprint representation vectors; where a dimension of each convolved voiceprint representation vector is at least the same as an input dimension of a decoder in the speech generator; and the voice conversion module 830 is specifically configured to input the content representation vector and the one or more convolved voiceprint representation vectors into the speech generator to obtain the converted speech.

Figure 9:
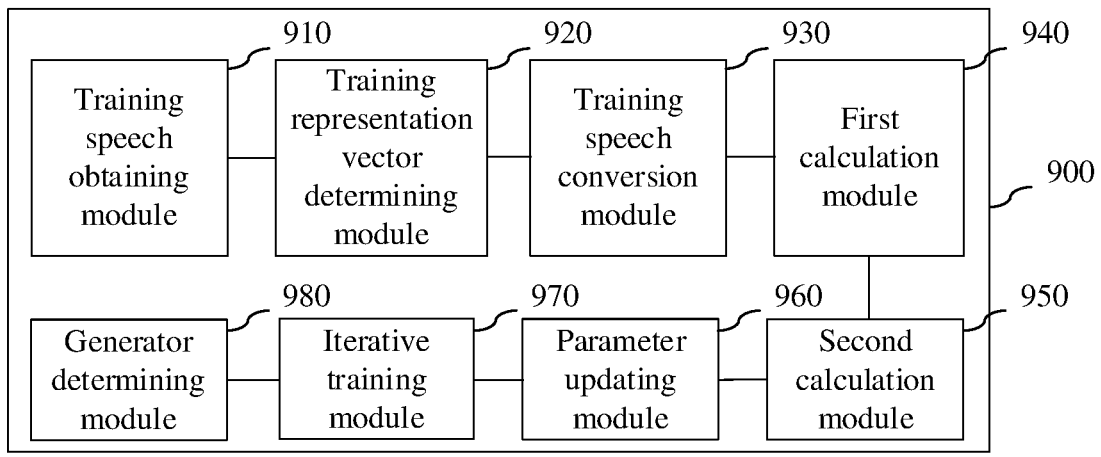
FIG. 9 is a schematic structural diagram of a model training device according to an embodiment of the present invention.

Referring to FIG. 9 of the description, FIG. 9 is a structure of a model training device 900 according to an embodiment of the present invention. The device 900 can be installed in an electronic device. Specifically, as shown in FIG. 9, the device 900 may include:

a training speech obtaining module 910, configured to obtain multiple training speeches having a second voiceprint;

a training representation vector determining module 920, configured to determine a training content representation vector and a training voiceprint representation vector corresponding to each training speech, where the training content representation vector is obtained based on the speech waveform of the training speech;

a training speech conversion module 930, configured to input the training content representation vector and the training voiceprint representation vector corresponding to each training speech into a preset speech generation network, to obtain a corresponding training converted speech;

a first calculation module 940, configured to calculate a value of a first loss function based on the training converted speech;

a second calculation module 950, configured to input each training speech and the training converted speech corresponding to each training speech into a preset discriminator network to perform discrimination, and calculate a value of a second loss function;

a parameter updating module 960, configured to update network parameters of the speech generation network based on the value of the first loss function, and update network parameters of the discriminator network based on the value of the second loss function;

an iterative training module 970, configured to perform iterative training based on the speech generation network and the discriminator network after the parameters are updated, until the value of the first loss function and the value of the second loss function both meet a model convergence condition; and a generator determining module 980, configured to use the trained speech generation network as a speech generator.

In a possible embodiment, the training representation vector determining module 920 may include:

a training content representation vector determining unit, configured to determine a training content representation vector corresponding to each training speech based on a preset content encoding network;

a training voiceprint representation vector determining unit, configured to determine a training voiceprint representation vector corresponding to each training speech based on a preset voiceprint encoding network.

The parameter updating module 960 is further configured to update network parameters of the content encoding network and the voiceprint encoding network based on the value of the first loss function.

The iterative training module 970 is further configured to perform iterative training based on the content encoding network, the voiceprint encoding network, the speech generation network, and discriminator network after the parameters are updated, until the value of the first loss function and the value of the second loss function both meet the model convergence condition.

The device 900 may further include:

an encoder determining module, configured to use the trained content encoding network as a content encoder and the trained voiceprint encoding network as a voiceprint encoder.

It should be noted that, when the functions of the device provided by the above embodiments are implemented, only the division of the above functional modules is used as an example for description. In practical applications, the above functions can be completed by being allocated to different functional modules according to needs, that is, the internal structure of the device is divided into different functional modules, to complete all or part of the functions described above. In addition, the connection relationship between the functional modules in FIG. 8 and FIG. 9 is only an example and does not represent the only manner of connection between the functional modules. Each functional module can be in communication connection with any other functional module according to its functional requirements. In addition, the device provided by the above embodiments and the corresponding method embodiments belong to the same concept, and the specific implementation process can be found in the corresponding method embodiments. Details are not described herein.

An embodiment of the present invention further provides a computer-readable storage medium, and the computer-readable storage medium can be disposed in an electronic device to save related computer programs/instructions used to implement a voice conversion method or a model training method. When the computer programs/instructions are loaded and executed by a processor, the voice conversion method or the model training method provided by the above method embodiments is implemented.

Optionally, in the embodiment of the present invention, the storage medium may include but is not limited to: a USB disk, a read-only memory (ROM, Read-Only Memory), a random access memory (RAM, Random Access Memory), a mobile hard disk, a magnetic disk, or an optical disk and other media that can store program code.

An embodiment of the present invention further provides a computer program product. The computer program product includes a computer program/instruction. When the computer program product is run on an electronic device, the computer program/instruction is loaded and executed by the processor to implement the steps of the voice conversion method or the model training method provided in the various optional embodiments.

It should be noted that the order of the embodiments of the present invention is only for description and does not represent the advantages and disadvantages of the embodiments.

Specific embodiments of this description have been described above. Other embodiments are within the scope of the appended claims. In some cases, the actions or steps recorded in the claims can be performed in a different order than that in the embodiments and still achieve the desired results. Additionally, the processes depicted in the drawings do not necessarily require the specific order shown or a sequential order, to achieve desirable results. In certain implementations, multitasking processing and parallel processing are also possible or may be advantageous.

Each embodiment in the description is described in a progressive manner. For the same and similar parts between the various embodiments, reference can be made to each other. Each embodiment focuses on its differences from other embodiments. In particular, for the device embodiment, because the device embodiment is basically similar to the method embodiment, the device embodiment is described in a relatively simple manner. For relevant details, please refer to the partial description of the method embodiment.

The person of ordinary skill in the art can understand that all or part of the steps to implement the above embodiments can be completed by hardware, or can be completed by instructing relevant hardware through a program. The program can be stored in a computer-readable storage medium. The storage medium mentioned above can be a read-only memory, a magnetic disk, or an optical disk, etc.

The above embodiments are only preferred embodiments of the present invention and are not intended to limit the present invention. Any modifications, equivalent substitutions, improvements, etc. made within the spirit and principles of the present invention shall be included in the scope of protection of the present invention.

The invention claimed is:

1. A voice conversion method, used in an electronic device, comprising:
   a content representation vector determining step comprising determining a target speech to be converted and a content representation vector corresponding to the target speech, wherein the target speech has a first content and a first voiceprint, and the content representation vector is obtained based on the speech waveform of the target speech;
   a voiceprint representation vector determining step comprising determining a reference speech and a voiceprint representation vector corresponding to the reference speech, wherein the reference speech has a second voiceprint, and the second voiceprint is different from the first voiceprint; and
   a voice conversion step comprising generating a converted speech based on a speech generator according to the content representation vector and the voiceprint representation vector, wherein the converted speech has the first content and the second voiceprint;
   wherein the speech generator is obtained by jointly training a preset speech generation network and a preset discriminator network by using a training speech having the second voiceprint.

2. The method according to claim 1, wherein the speech generator is obtained by jointly training the speech generation network and the discriminator network based on a first loss function and a second loss function by using the training speech; wherein
   a value of the first loss function is obtained by calculation according to a training converted speech corresponding to the training speech, a value of the second loss function is obtained by inputting the training speech and the training converted speech corresponding to the training speech into the discriminator network to perform discrimination and calculation, the training converted speech is obtained by inputting a training content representation vector and a training voiceprint representation vector corresponding to the training speech into the speech generation network, and the training content representation vector is obtained according to the speech waveform of the training speech.

3. The method according to claim 1, wherein the content representation vector determining step comprises:
   determining the speech waveform of the target speech; and
   inputting the speech waveform of the target speech into a content encoder to obtain the corresponding content representation vector.

4. The method according to claim 1, wherein the voiceprint representation vector determining step comprises:
   extracting a Mel-spectrogram feature of the reference speech; and
   inputting the Mel-spectrogram feature into a voiceprint encoder to obtain a corresponding mean vector and a variance diagonal matrix; and
   determining the voiceprint representation vector corresponding to the reference speech according to the mean vector and the variance diagonal matrix.

5. The method according to claim 1 or 4, wherein the method further comprises:
   performing 1×1 convolution on the voiceprint representation vector to obtain one or more convolved voiceprint representation vectors;
   wherein a dimension of each convolved voiceprint representation vector is at least the same as an input dimension of one decoder in the speech generator; and
   the voice conversion step comprises inputting the content representation vector and the one or more convolved voiceprint representation vectors into the speech generator to obtain the converted speech.

6. The method according to claim 1, wherein the reference speech has a second content, and the second content is different from the first content.

7. The method of claim 1, wherein the method is executed with an electronic device, comprising a memory, a processor, and a computer program stored on the memory, wherein the processor executes the computer program to implement the steps of the voice conversion method.

8. The method of claim 1, wherein the method is executed with a non-transitory computer-readable storage medium on which a computer program/instruction is stored, wherein, when the computer program/instruction is executed by a processor, the steps of the voice conversion method.

9. A model training method, used for an electronic device, comprising:
- a training speech obtaining step comprising obtaining multiple training speeches having a second voiceprint;
- a training representation vector determining step comprising determining a training content representation vector and a training voiceprint representation vector corresponding to each training speech, wherein the training content representation vector is obtained based on the speech waveform of the training speech;
- a training speech conversion step comprising inputting the training content representation vector and the training voiceprint representation vector corresponding to each training speech into a preset speech generation network, to obtain a corresponding training converted speech;
- a first calculation step comprising calculating a value of a first loss function based on the training converted speech;
- a second calculation step comprising inputting each training speech and the training converted speech corresponding to each training speech into a preset discriminator network to perform discrimination, and calculating a value of a second loss function;
- a parameter updating step comprising updating network parameters of the speech generation network based on the value of the first loss function, and updating network parameters of the discriminator network based on the value of the second loss function;
- an iterative training step comprising performing iterative training based on the speech generation network and the discriminator network after the parameters are updated, until the value of the first loss function and the value of the second loss function both meet a model convergence condition; and
- a generator determining step comprising using the trained speech generation network as a speech generator.

10. The method according to claim 9, wherein the training representation vector determining step comprises:
- determining a training content representation vector corresponding to each training speech based on a preset content encoding network; and
- determining a training voiceprint representation vector corresponding to each training speech based on a preset voiceprint encoding network; and the model training method further comprises:
- updating network parameters of the content encoding network and the voiceprint encoding network based on the value of the first loss function; and
- using the trained content encoding network as a content encoder, and using the trained voiceprint encoding network as a voiceprint encoder.

11. The method according to claim 10, wherein both the content encoding network and the voiceprint encoding network are encoding networks based on an attention mechanism, and the speech generation network is a decoding network based on an attention mechanism.

12. The method according to claim 11, wherein the content encoding network comprises multiple Transformer encoders, the voiceprint encoding network comprises multiple Transformer encoders and an average pooling layer, the speech generation network comprises multiple Transformer decoders, and the discriminator network comprises multiple discriminators.

13. The method of claim 9, wherein the method is executed with an electronic device, comprising a memory, a processor, and a computer program stored on the memory, wherein the processor executes the computer program to implement the steps of the model training method.

14. The method of claim 9, wherein the method is executed with a non-transitory computer readable storage medium on which a computer program/instruction is stored, wherein, when the computer program/instruction is executed by a processor, the steps of the model training method are implemented.

* * * * *